Jan. 19, 1971  J. B. AITKEN  3,555,749
COLLAPSIBLE HOUSING
Filed Nov. 14, 1968  2 Sheets-Sheet 1

INVENTOR.
JAMES B. AITKEN
BY Townsend and Townsend
ATTORNEYS

Jan. 19, 1971 J. B. AITKEN 3,555,749
COLLAPSIBLE HOUSING
Filed Nov. 14, 1968 2 Sheets-Sheet 2
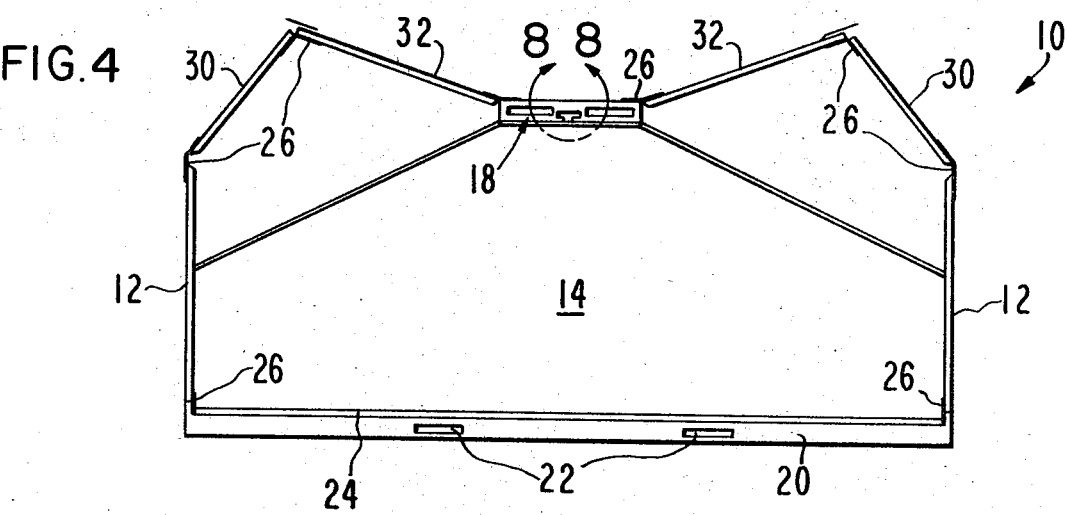
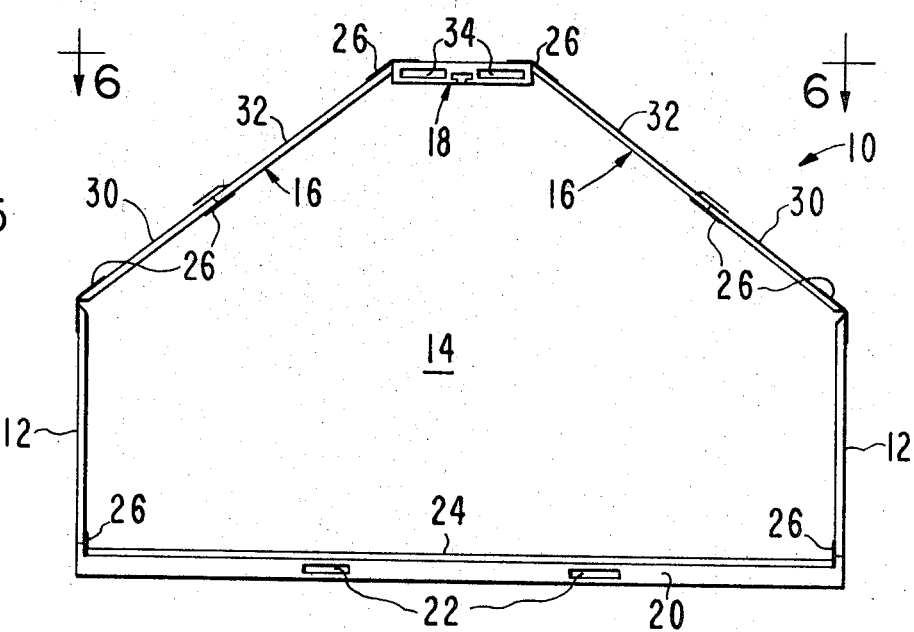
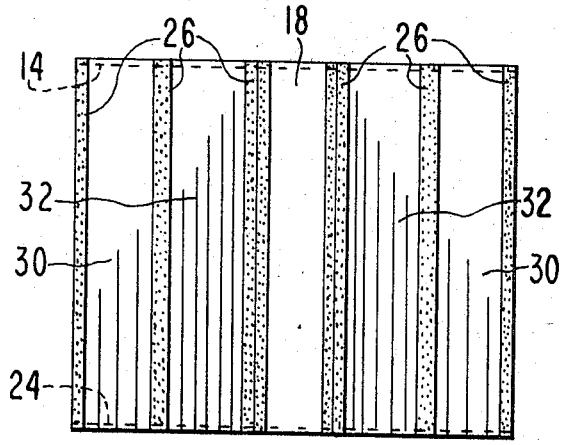
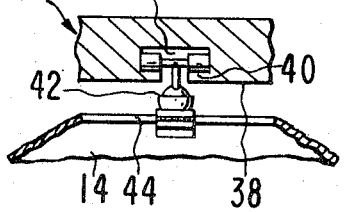
INVENTOR.
JAMES B. AITKEN
BY Townsend and Townsend
ATTORNEYS

United States Patent Office 3,555,749
Patented Jan. 19, 1971

3,555,749
COLLAPSIBLE HOUSING
James B. Aitken, Walnut Creek, Calif., assignor to Instant Structures, Inc., Albany, Calif.
Filed Nov. 14, 1968, Ser. No. 775,669
Int. Cl. B65d 9/12; E04b 1/343
U.S. Cl. 52—70
6 Claims

ABSTRACT OF THE DISCLOSURE

A collapsible housing formed from a number of hingedly interconnected, generally rigid walls wherein the walls are arranged for movement relative to each other from respective collapsed positions with the walls in a stack to expanded positions with the walls arranged to form the housing. The housing has an end wall which moves into an operative position closing one end of the housing when the latter is expanded. Another end wall can be used to close the opposite end of the housing. The invention is suitable for use as a cargo container for airplanes.

---

This invention relates to improvements in collapsible structure and, more particularly, to a collapsible housing suitable for use as a cargo container.

Conventional jet airplanes haul freight or cargo in containers which are permanent structures in that they have rigidly interconnected walls so that they maintain their shapes at all times. A number of such cargo containers can be put into an airplane in end-to-end relationship after the containers have been loaded with cargo on the ground. The containers are put into the airplane through the cargo door at the side. The containers are then moved longitudinally of the airplane until they are adjacent to another container. When fully loaded, the airplane has a number of aligned cargo containers in it.

The aforesaid conventional cargo containers, because of their rigid construction, require a relatively large amount of space for storage. They also must be of rugged construction to withstand rough handling since they must be moved about with fork lift trucks and must withstand weather extremes. Only a limited number of such containers can be stored in a given space; other containers must be stored outside a warehouse, for instance, if no space is available in the warehouse.

The present invention avoids these and other problems associated with conventional cargo containers by providing a housing suitable for use in holding cargo wherein the housing can be readily collapsed and expanded and, when expanded, the housing presents a rigid construction that can easily be moved about with conventional heavy-duty moving equipment. Also, the housing is constructed so that, when it is expanded, it will conform to the interior of a conventional jet airplane and, when it is collapsed, it can be easily stored in a minimum of space and thereafter made ready for use in a minimum of time.

The advantages of the present invention are achieved by the specific way in which side, end and top walls of the housing are hingedly interconnected so that they are relatively shiftable to permit the housing to be collapsed with the walls substantially parallel to each other and expanded with the walls in their normal operative positions. The collapsibility feature of the housing, thus, provides for easy storage and handling since a greater number of the collapsed housings can be stored in a given space than is capable with conventional containers.

The primary object of this invention is to provide an improved collapsible housing having a number of relatively shiftable walls capable of moving from collapsed positions with the walls in stacked relationship to each other to expanded positions defining the housing whereby the housing may be configured to present a cargo container suitable for use in a cargo-carrying airplane.

Another object of this invention is to provide a housing of the type described which has a size substantially conforming to the interior of a conventional jet airplane whereby the housing may be adapted as a cargo container for such an airplane and can be readily moved into and out of the airplane in its expanded and collapsed conditions.

A further object of this invention is to provide a collapsible housing of the aforesaid character wherein the top wall of the housing has structure coupled with an end wall thereof so that, as the housing is expanded, the structure automatically elevates the end wall into a position to make the housing readily for receiving articles of cargo or the like as soon as the top is in its operative position.

Still another object of this invention is the provision of a collapsible housing whose side, top and bottom walls can be collapsed into positions with the walls substantially parallel to each other to minimize the storage space required for the collapsed housing and to permit the housing to be moved from place to place with ease notwithstanding the relatively large size of the housing when the same is expanded.

Other objects of this invention will become apparent as the following specification progresses, reference being had to the accompanying drawings for an illustration of a preferred embodiment of the invention.

In the drawings:

FIG. 4 is a view of the housing with the sidewalls in place and with the top partially expanded;

FIG. 5 is an end elevational view of the housing when it is completely expanded and ready for use;

FIG. 6 is a top plan view of the expanded housing;

FIG. 8 is an enlarged, fragmentary, cross-sectional view of the connection between the top wall and an end wall of the housing.

Figure 1:
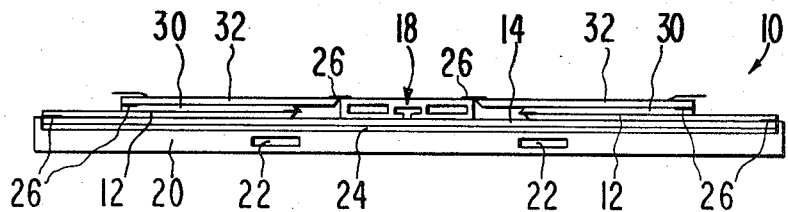
FIG. 1 is an end elevational view of the housing when it is fully collapsed with the various walls thereof in stacked relationship to each other.

The housing of this invention is broadly denoted by the numeral 10 and includes a pair of sidewalls 12, a first end wall 14, a top wall unit including a pair of top walls 16 and a generally horizontal beam 18 at the adjacent extremities of top walls 16. Sidewalls 12 are hingedly connected to a base or pallet 20 which defines the bottom of the housing, pallet 20 having a pair of openings 22 therein for receiving the spaced forks of a fork lift truck. This feature allows the building to be moved from place to place regardless of whether it is collapsed or expanded.

A second end wall 24 is shown in FIG. 5 as lying flat on pallet 20. End wall 24 has essentially the same configuration as end wall 14 and, for purposes of illustration, is manually positionable on the end of housing 10 opposite to the end covered by end wall 14 when housing 10 is fully expanded as shown in FIG. 5. Suitable fastening means (not shown) is used to releasably secure end wall 24 in covering relationship to the corresponding end of the housing.

Figure 7:
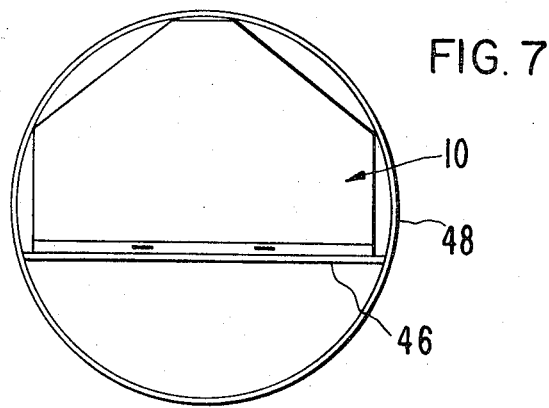
FIG. 7 is a schematic view of the housing within the fuselage of an airplane.

The walls of housing 10 are hingedly interconnected and, for this purpose, any suitable hinge may be used at each hinge location. For purposes of illustration, each hinge of housing 10 includes an elongated strip 26 of suitable fabric or other flexible material secured by brackets or otherwise to the walls interconnected by the strip. As shown in FIG. 7, a strip 26 interconnects a sidewall 12 with a top wall 16. Each strip 26 is flexible so that it can be bent in either direction. Each strip is also imperforate for closing or sealing the corresponding junction. Moreover, each pair of adjacent walls which articulate relative to each other are so spaced that the housing can move from the completely collapsed condition (FIG. 1) to the completely expanded condition (FIG. 5). There are eight hinge locations for housing 10, such locations being denoted by the numeral 26 in FIG. 5 to indicate that a strip 26 or other hinge is at each location. Thus, there is a hinge at the following locations: at the junction between each sidewall 12 and pallet 20; at the junction between each sidewall 12 and the adjacent top wall 16; at the junction of each top wall 16 with beam 18; and at the mid point of each top wall, respectively, to divide it into two sections 30 and 32.

Beam 18 runs the length of housing 10 and essentially spans the distance betwen the ends thereof. Beam 18 has a pair of openings 34 therein for receiving the forks of a fork lift truck. Also, the beam has a longitudinally extending T-shaped slot or recess 36 in the normally lowermost face 38 thereof to provide track structure for roller means 40 carried on a connector, such as a pin 42, secured to the normally uppermost extremity 44 of end wall 14. The normally lowermost extremity of end wall 14 is hinged to the adjacent end edge of pallet 20. Thus, end wall 14 is raised and lowered as roller means 40 moves in and along the track in response to the raising and lowering of beam 18. During such movement, end wall 14 is raised and lowered with respect to pallet 20.

In use, housing 10 can be initially in the collapsed condition as shown in FIG. 1 with the various walls of the housing in stacked relationship to each other and substantially parallel to pallet 20 which supports the stack of walls. To this end, end wall 24 is in engagement with the upper surface of pallet 20 and end wall 14 is on top of and in engagement with end wall 24. Beam 18 will be supported on end wall 24 as well as both sidewalls 12. Section 30 of each top wall 16 will rest on the adjacent sidewall 12 and section 32 of each top wall 16 will rest on the adjacent section 30. Thus, the top surface of both sections 32 will be substantially flush with the upper surface of beam 18 when housing 10 is completely collapsed.

Figure 2:
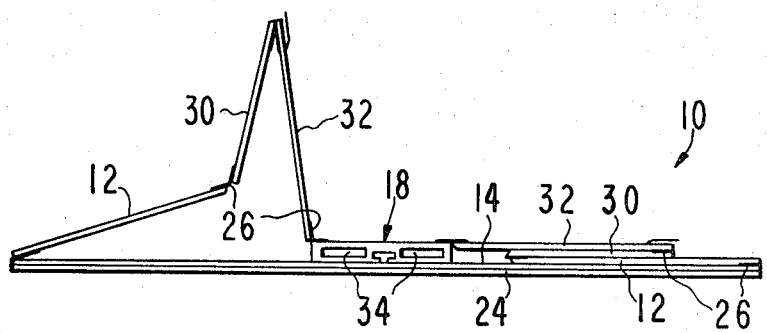
FIG. 2 is a view similar to FIG. 1 but showing an initial step in expanding the housing.
Figure 3:
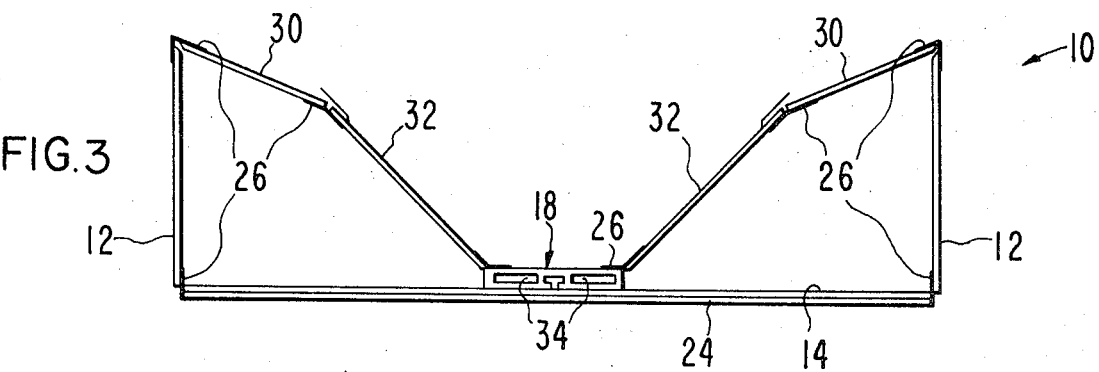
FIG. 3 is a view similar to FIGS. 1 and 2 and illustrating a later stage in the expansion of the housing.

To initiate the expansion of building 10, one section 32 is rotated into the position as shown in FIG. 2 following which the other section 32 is rotated toward an upright section 32. These movements can be effected manually and the material forming the various walls will be lightweight in character to permit such manual movement. This movement allows sidewalls 12 to be moved into their upright positions as shown in FIG. 3 before beam 18 is raised. The reason for this is that it might be difficult or cumbersome to raise end wall 14 with side and top walls 16 on end wall 14.

With the housing partially expanded as shown in FIG. 3, a fork lift truck is moved into position adjacent to the open end of the housing and the forks of the fork lift truck are inserted into openings 34 whereupon the forks are elevated to cause elevation of beam 18 and thereby end wall 14. In FIG. 4, this end wall is shown partially raised; hence, it is inclined with respect to pallet 20 and is to be moved to a generally vertical position when beam 18 is at its highest position. The motivating force for elevating end wall 14 is the movement of beam 18 which lifts pin 42 with it. Since end wall 14 is hinged to pallet 20, end wall 14 rotates about a generally horizontal axis (assuming pallet 20 to be essentially horizontal), whereby end wall 14 moves into a vertical position. In the completely expanded condition of housing 10, the top walls 16 and beam 18 are held in place by end wall 14. To this end, the end wall underlies top walls 16 and beam 18 to thereby support the same against collapsing. A suitable fastener (not shown) is provided to releasably hold the end wall in this position.

When the housing is expanded, cargo or other materials can be placed in the housing through the open end thereof. This will be done after end wall 24 has been taken off pallet 20 and out of the expanded housing. As soon as the housing has been loaded, end wall 24 can be put into place to close the housing, whereupon the latter can be lifted or moved in a desired manner to a different location.

The present invention is especially adapted for carrying cargo in a cargo airplane in the manner shown in FIG. 7 wherein anu mber of housings 10 in their expanded conditions can be positioned in end-to-end relationship within the fuselage on the floor 46 of the airplane 48. When so positioned, each housing 10 will substantially fill the interior of the corresponding portion of the airplane, whereby the interior of the airplane is utilized to the maximum extent. The housing can have and preferably has dimensions which permit it to conform generally to the interior of the airplane fuselage as shown in FIG. 7. Also, the size of the housing permits it to be readily moved into and out of the cargo opening in the side of the airplane. After the housing has been put into the airplane through this opening, the housing can then be moved longitudinally of the airplane into position, at which the housing will be fixed during flight.

At the destination of the airplane, the loaded housings can be removed from the airplane in the same manner as they were put into it. After the housings have been unloaded, they can be used again or collapsed into the conditon shown in FIG. 1 for storage until ready for use. Since the housing can be collapsed, a warehouse can store more of them than is capable with conventional cargo containers now in use. Also, they can be stored in a warehouse in a minimum of space so that they will not be subjected to weather extremes as is oftentimes the case with conventional containers. The housing of this invention eliminates special ground handling equipment and can be fully collapsible to a pack having a height of approximately 9 inches. It is also compatible with existing airplanes and it provides better protection against theft because of the use of end wall 24 for closing the housing.

The various walls of housing 10 are generally rigid and substantially flat. Thus, the walls are self-sustaining when the housing is expanded and are substantially parallel when the housing is collapsed. Any suitable material can be used to form the walls and they can be imperforate or provided with accesses or other openings as desired.

In the claims:

1. A collapsible housing comprising: a base having a pair of sides and an end; a pair of sidewalls, each sidewall having an upper extremity and a lower extremity, the lower extremity of each sidewall being hingedly coupled to respective sides of the base; a top wall unit having a pair of side margins hingedly connected to the upper extremities of respective sidewalls; an end wall having a lower margin and an upper margin, the lower margin of said end wall being hingedly coupled to said end of the base, the upper margin of said end wall being shiftably connected to and movable along said top wall unit, said sidewalls, said top wall unit and said end wall defining an assembly capable of being alternately collapsed and expanded with the walls being in stacked relationship when the assembly is collapsed, said end wall being movable in response to the movement of said top wall unit.

2. A collapsible housing as set forth in claim 1, wherein the walls are substantially flat and are disposed in side-by-side relationship when the assembly is collapsed.

3. A collapsible housing as set forth in claim 1, wherein the end wall is disposed between the base and said sidewalls, and the sidewalls are disposed between the end wall and the top wall unit when said assembly is collapsed.

4. A collapsible housing comprising: a pair of spaced sidewalls; means mounting the sidewalls for movement between upright positions with the walls spaced apart to collapsed positions with the walls substantially horizontal and in stacked relationship to each other; a top wall unit; means hingedly connecting the top wall unit to the sidewalls for movement therewith from a first location overlying the space between the sidewalls when the latter are upright to a second location with the top wall unit in stacked relationship to the sidewalls, the sidewalls and top wall unit defining an enclosure when they are in said upright positions and said first location, respectively; an end wall; structure defining a track on said top wall unit; and a connector coupling the normally uppermost extremity of the end wall to the track for movement longitudinally thereof, whereby the end wall is movable into and out of closing relationship to one end of the enclosure in response to the movement of the top wall unit between said locations.

5. A collapsible housing comprising: a pair of spaced sidewalls, means mounting the sidewalls for movement between upright positions with the walls spaced apart to collapsed positions with the walls substantially horizontal and in stacked relationship to each other; a top wall unit having a pair of opposed ends; means hingedly connecting the top wall unit to the sidewalls for movement therewith from a first location overlying the space between the sidewalls when the latter are upright to a second location with the top wall unit in stacked relationship to the sidewalls, the sidewalls and top wall unit defining an enclosure when they are in said upright positions and said first location, respectively; an end wall; track structure secured to said top wall unit and extending between the ends thereof; and roller means coupled with said track structure and to the normally uppermost extremity of the end wall for shiftably mounting said extremity on said top wall unit for movement longitudinally of said track structure and thereby into and out of closing relationship to one end of the enclosure as the top wall unit is raised and lowered.

6. A housing as set forth in claim 5, wherein said track structure includes a beam on said top wall unit, said beam having a pair of openings therein for receiving the forks of a fork lift truck.

References Cited

UNITED STATES PATENTS

| | | | |
|---|---|---|---|
| 3,050,331 | 8/1962 | Mansen | 52—66 |
| 3,189,949 | 6/1965 | Hurkamp | 52—71 |
| 3,231,942 | 2/1966 | O'Brien | 52—70 |
| 3,356,410 | 12/1967 | Taylor | 52—66 |
| 3,375,035 | 3/1968 | Schultz | 52—66 |
| 3,394,961 | 7/1968 | Matte | 296—27 |
| 3,398,850 | 8/1968 | Kennard | 217—14X |

OTHER REFERENCES

German printed application No. 1,255,907 to Lewandowski, Dec. 7, 1967.

JOHN E. MURTAGH, Primary Examiner

U.S. Cl. X.R.

217—15; 296—23